E. H. DAVIS.
DEMOUNTABLE RIM DEVICE.
APPLICATION FILED AUG. 23, 1916.

1,242,330.

Patented Oct. 9, 1917.
2 SHEETS—SHEET 1.

Witness
Edwin L. Bradford

Inventor
E. H. Davis
By Greene & Greene,
Attorneys

E. H. DAVIS.
DEMOUNTABLE RIM DEVICE.
APPLICATION FILED AUG. 23, 1916.
1,242,330.
Patented Oct. 9, 1917.
2 SHEETS—SHEET 2.
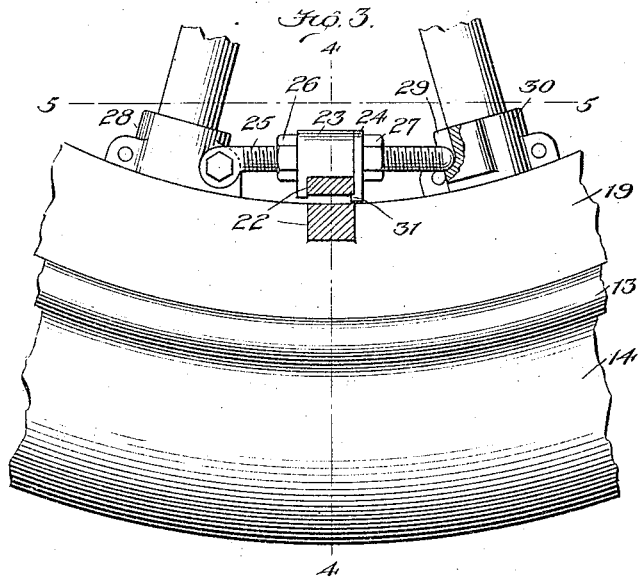
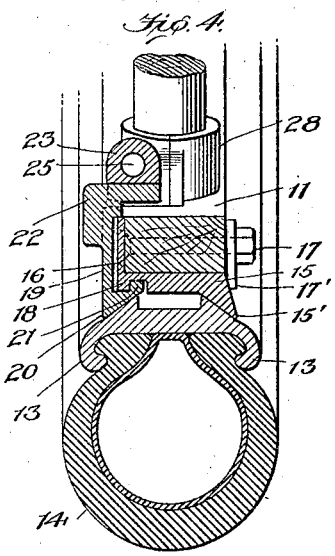
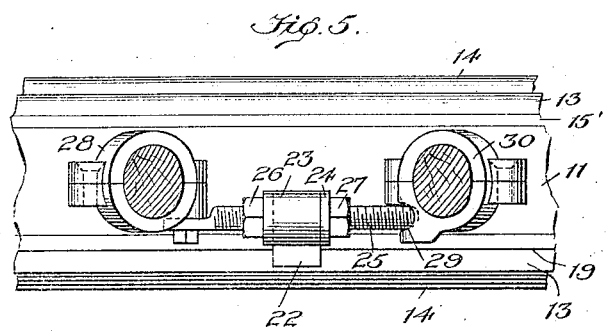
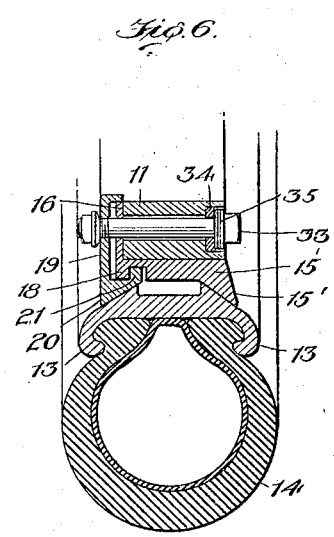
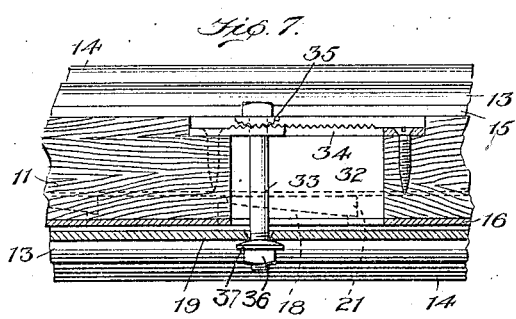
Witness
Edwin L. Bradford
Inventor
E. H. Davis
By Greene & Greene,
Attorneys

UNITED STATES PATENT OFFICE.

ELAM H. DAVIS, OF MEMPHIS, TENNESSEE.

DEMOUNTABLE-RIM DEVICE.

1,242,330. Specification of Letters Patent. Patented Oct. 9, 1917.

Application filed August 23, 1916. Serial No. 116,408.

*To all whom it may concern:*

Be it known that I, ELAM H. DAVIS, a citizen of the United States, and resident of Memphis, in the county of Shelby and State of Tennessee, have invented certain new and useful Improvements in Demountable-Rim Devices, of which the following is a specification, reference being had therein to the accompanying drawing.

This invention relates to demountable wheel-rims, and a leading object is to provide an improved rim which is simple, inexpensive, not liable to accident or accidental detachment, and that is very quickly detached or demounted and replaced when desired.

In the accompanying drawings,

Fig. 3 is an enlarged view of adjusting devices seen in Fig. 1, parts being broken away.

Figure 1:
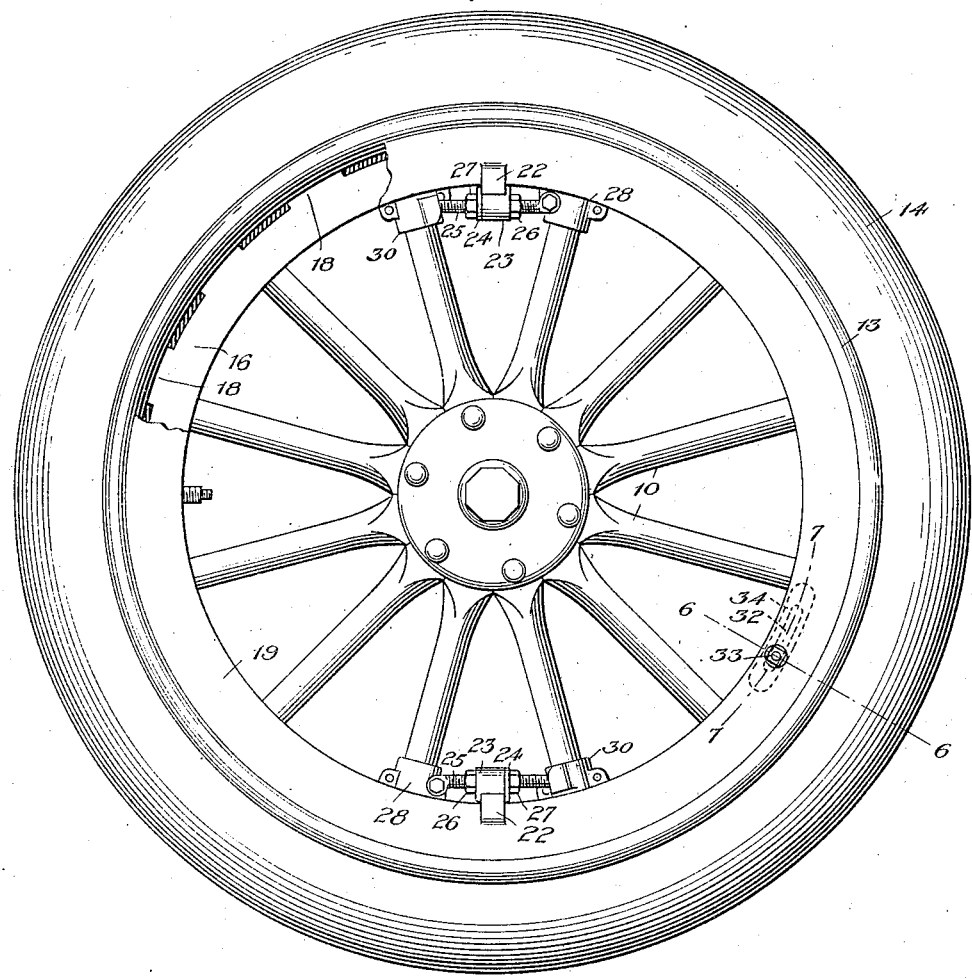
Figure 1 is a side view of a wheel embodying my invention, parts being broken away to show a member in a plane parallel to the face of the wheel.
Figure 2:
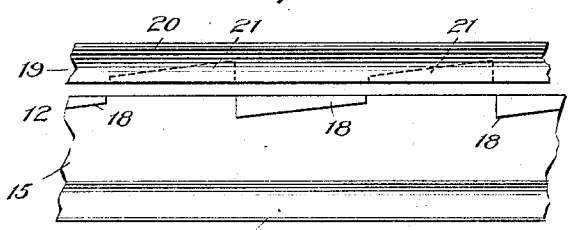
Fig. 2 is a view looking toward the center of the wheel and showing portions of mutually engaging rim holding ring members, the two being slightly separated.

Fig. 4 is a section on the line 4—4, Fig. 3.
Fig. 5 is a section on the line 5—5, Fig. 3.
Fig. 6 is a section on the line 6—6, Fig. 1.
Fig. 7 is a section on the curved line 7—7, Fig. 1.

In these figures, 10 represents an ordinary wheel the felly 11 of which is encircled by a two-part band or ring 12 divided in or parallel to the plane of the wheel and holding a demountable rim 13 in which is mounted a pneumatic tire 14, the rim and tire being without novelty and usually carried as a whole with the tire fully inflated, so that substituting this tire for another requires only putting this rim in place and securing it on the wheel. The main part of the band 12 consists of a ring 15 fitting the periphery of the felly and having on one lateral face of the latter a flange 16, which is secured to the felly by bolts 17, clips 17' being placed on the bolts beneath the nuts to press against the band. On the side opposite said flange, the band has an outwardly projecting flange 15' against which the rim 13 fits, and at the opposite side of the felly it is cut away to form wedge-like spaced lugs or teeth 18. The other part of the band 12 is a ring 19 having on its outer side a flange 20 adapted to fit the rim 13 and coact with the flange 15' in holding the rim. The opposite side of this ring is provided with wedge-like teeth 21 in position to pass between the teeth 18 and by relative rotation of the ring engage them, respectively, and bind this ring to the main part 15 of the band while pressing the flange 20 against the rim. To compel the relative rotation of the two parts, the ring 19 is provided with integral lugs 22 on its inner surface and each of these is engaged by a divided block 23, 24 which moves freely on a threaded rod 25 and which lies between nuts 26, 27 by which the block and lug are forced to travel with respect to the rod. This rod is pivoted at one end to a clip 28, secured to a spoke alongside the felly, to swing in the plane of the wheel. When swung toward the felly its free end enters a notch 29 in a clip 30 secured to the adjacent spoke, and is thus held against movement from the plane in which it swings. One part at least of the divided block has a lip 31 which engages under the lug, and thus the rod is locked against swinging from the felly. When the ring is to be forcibly rotated for attaching the rim, one of the nuts is screwed against the adjacent block, after the other nut has been moved slightly from the block, and the block pushing the lug 22 compels the ring 19 to rotate and engage its teeth 21 behind the teeth 18 of the ring 15. When this engagement is fully completed, the other nut is screwed firmly against the opposite side of the block, each nut thus serving as a locknut for the other. The lip 31 now holds the block against moving inwardly and the notch 29 prevents the threaded rod 25 from bending or moving with respect to the plane of the wheel. When the rim is to be detached, one nut is moved from the block far enough to allow the slight lip 31 to disengage, the other nut is forced strongly against the block, and, if necessary, the projecting lug 22 is given a smart blow, such blow when the ring is strongly pressed by the nut being sufficient to start relative rotation, and loosen the engagement of the teeth. This done, the rod 25 is swung away with its block, releasing the ring, which is then readily detached so that the rim and its tire may be freely removed and replaced.

Two devices like that just described are preferably used, usually on opposite sides of the wheel. A further locking device is also employed at an intermediate point on the wheel. At this point the felly 11 is transversely slotted at 32 to receive a bolt 33. Surrounding this slot is a serrated plate 34 sunk in the felly and engaged by the teeth on the slightly curved face of a serrated washer 35 under the head of the bolt 33. The bolt lying in the slot passes loosely through a hole in the flange of the ring 19, and is provided with an external nut 36 and washer 37 having its inner surface slightly curved. This nut being partly unscrewed, these parts do not prevent the rotation of the ring 19 in the manner already set forth, and when the ring has been brought to position, the bolt is made slightly inclined to the plane of the felly, the serrated washer is engaged with the serrated plate and the nut is forcibly screwed home. The tendency is to force still further engaging motion of the ring 19, and the bolt and serrated connections lock the parts against contrary movement. With this added locking device, the parts are rigidly locked and never, in use, allow the rim to become loose accidentally.

The band or two-part ring forms a sort of channel member to receive and hold the tire carrying rim.

What I claim is:

1. The combination with a wheel having fixed thereto a felly-receiving, rim-encircling channel member, of a co-acting channel member provided with an inwardly extending projection and adapted to interlock with the member first mentioned by relative rotation, a rod having at one end a hinge fixed with respect to the member first mentioned and permitting the rod to swing toward and from said projection, means carried by the rod's middle portion for engaging and disengaging said projection as the rod swings back and forth, devices for forcing said means to travel back and forth upon the rod and locking said means from disengagement, and means for holding the non-hinged end of the rod in the plane in which it swings.

2. The combination with a wheel having a rigidly attached peripheral channel member, of a second channel member adapted for engaging the first by relative rotation, a threaded rod pivoted to the wheel at one end to swing in the wheel's plane toward and away from the inner side of the channel, devices sliding on the rod and adapted to engage and disengage the second member as the rod moves toward and away from the same, nuts for forcing said devices along the rod, and means for locking the rod against swinging when said devices are engaged.

3. The combination with a wheel felly having a rigidly attached peripheral channel member, and provided with a transverse slot, of a coacting channel member having a flange extending over the face of the felly, a bolt passing through said flange and through the felly in said slot, a plate fixed to the felly upon the side opposite said flange and having serrations alongside said slot, a bolt provided at one end with devices to engage the serrated plate and at the other end with devices for engaging said flange.

4. The combination with a wheel felly having a rigidly attached peripheral channel member and provided with a transverse slot-like passage for a bolt, of a correspondingly slotted serrated plate fixed to one side of the felly, a rocking serrated washer engaging the plate, a second channel member having a perforated flange extending over the other side of the felly, a bolt passing through said washer, plate, slotted felly and flange, and a rocking nut engaging said bolt and locking rigidly the parts through which the bolt passes.

5. The combination with a wheel having spokes, and a felly provided with a rigidly attached channel member, of a second channel member adapted to engage the first by relative rotation and provided with a lug projecting over the inner face of the member first mentioned, collars fixed to the spokes, respectively, on each side of said lug, a threaded rod pivoted on one of said collars to swing in the plane of the wheel into and out of a notch in the other collar, a block sliding on said rod and adapted to move against said lug and to engage beneath the same, and nuts working on the rod on opposite sides of the lug.

In testimony whereof I hereunto affix my signature.

ELAM H. DAVIS.